(12) United States Patent
Kuwano et al.

(10) Patent No.: US 8,580,221 B2
(45) Date of Patent: Nov. 12, 2013

(54) CHROMIUM (III) CARBONATE AND PROCESS FOR PRODUCING THE SAME

(75) Inventors: Hiroyuki Kuwano, Yamaguchi (JP); Tomohiro Banda, Yamaguchi (JP); Yasuyuki Tanaka, Yamaguchi (JP)

(73) Assignee: Nippon Chemical Industrial Co., Ltd., Tokyo (JP)

( * ) Notice: Subject to any disclaimer, the term of this patent is extended or adjusted under 35 U.S.C. 154(b) by 357 days.

(21) Appl. No.: 13/062,478

(22) PCT Filed: Aug. 27, 2009

(86) PCT No.: PCT/JP2009/064960
§ 371 (c)(1),
(2), (4) Date: Mar. 4, 2011

(87) PCT Pub. No.: WO2010/026915
PCT Pub. Date: Mar. 11, 2010

(65) Prior Publication Data
US 2011/0168051 A1 Jul. 14, 2011

(30) Foreign Application Priority Data

Sep. 5, 2008 (JP) ................................. 2008-228264

(51) Int. Cl.
*C01B 31/24* (2006.01)
(52) U.S. Cl.
USPC ..................................... 423/419.1; 106/1.25
(58) Field of Classification Search
USPC ...................................... 106/1.25; 423/419.1
See application file for complete search history.

(56) References Cited

U.S. PATENT DOCUMENTS 4,528,175 A * 7/1985 Walther et al. ................ 423/492

OTHER PUBLICATIONS

International Preliminary Report on Patentability for PCT/JP2009/064960 dated Apr. 12, 2011.*

* cited by examiner

*Primary Examiner* — Stanley Silverman
*Assistant Examiner* — Richard M Rump
(74) *Attorney, Agent, or Firm* — J.C. Patents

(57) ABSTRACT

The chromium (III) carbonate of the present invention exhibits a light blue color in a solid state. This chromium (III) carbonate has an L* value of 50 to 70, an a* value of −4 to −2, and a b* value of −10 to −7, which are represented by the L*a*b* color system (JIS Z8729). This chromium (III) carbonate is preferably completely dissolved within 30 minutes when the chromium (III) carbonate is added, in an amount corresponding to a Cr content of 1 g, to 1 liter of an aqueous solution of hydrochloric acid having a pH of 0.2 at a temperature of 25° C. This chromium (III) carbonate is preferably obtained by contacting an aqueous solution of carbonate and an aqueous solution containing trivalent chromium at a pH of 6 to 12 under the condition of a reaction liquid temperature of 0° C. or more and less than 50° C. Also, preferably, after production of the chromium (III) carbonate, filtration is performed, and the chromium (III) carbonate is washed with water until the conductivity of the filtrate is 5 mS/cm or less.

10 Claims, No Drawings

CHROMIUM (III) CARBONATE AND PROCESS FOR PRODUCING THE SAME

TECHNICAL FIELD

The present invention relates to chromium (III) carbonate and a process for producing the same. The chromium (III) carbonate produced according to the process of the present invention is useful for metal surface treatment such as chromium plating and trivalent chromium chemical conversion treatment.

BACKGROUND ART

Chromium plating is used for decoration and for industrial use in many industrial fields. Chromium plating is widely used as decoration plating because it does not corrode in the air and does not lose luster. Also, chromium plating is widely used for mechanical parts and the like that require wear resistance because it has high hardness and a low friction coefficient. A large amount of hexavalent chromium is used in a plating liquid used for this plating. Since the effect of hexavalent chromium on the human body is feared, hexavalent chromium must be reduced to trivalent chromium under very strict conditions so that the hexavalent chromium is not released in the environment in the treatment of the plating waste liquid. Therefore, the development of a plating liquid using trivalent chromium, instead of hexavalent chromium, is desired.

For the plating liquid using trivalent chromium, for example, Patent Document 1 describes a chromium plating liquid using a trivalent chromium compound, such as chromium chloride, chromium sulfate, and chromium sulfamate, as a plating liquid for decoration plating. However, when an inorganic salt of trivalent chromium, such as chromium chloride or chromium sulfate, is used as a source of chromium, chromium is consumed by plating, while chloride ions or sulfate ions, which are the counteranions of the chromium salt, remain in the plating liquid. From the necessity to keep the liquid composition of the plating liquid constant, the plating liquid is used by appropriately adding the source of chromium in an amount corresponding to the consumed chromium, and therefore, chloride ions or sulfate ions are accumulated in the plating liquid. Therefore, finally, the liquid composition cannot be kept constant, and thus, the total amount of the plating liquid is replaced by a new plating liquid, and the spent plating liquid is treated as a waste liquid.

As a process for solving this problem, Patent Document 2 proposes a trivalent chromium plating process in which when trivalent chromium plating is performed using a plating liquid containing chromium chloride and ammonium chloride, part of the plating liquid is circulated in a cooling apparatus, and part of the ammonium chloride is crystallized and removed in this cooling apparatus to perform plating while controlling the concentration of the ammonium chloride in the plating liquid.

Also, solving this problem by using, as a source of trivalent chromium, chromium hydroxide, which is a compound without counteranion accumulation, in the state of a water-containing gel is proposed (see Patent Document 3). However, chromium hydroxide generally has low solubility in water and also has low solubility in an acidic aqueous solution used as an ordinary plating liquid. Therefore, long-time stirring under heating is required for the preparation of a plating liquid. Also, when the consumed chromium is supplemented, a long time is required to dissolve supplied chromium hydroxide. For these reasons, the plating work is interrupted during that time, and problems occur in the preparation of the plating liquid and the plating work.

For example, processes described in Patent Documents 4 to 6 are known as conventional processes for producing chromium hydroxide. But, these documents do not mention using chromium (III) carbonate as a source of trivalent chromium, instead of chromium hydroxide.

Also, the following Non-Patent Document 1 describes that chromium (III) carbonate is obtained by adding an alkali carbonate or alkali hydrogencarbonate solution to an aqueous solution of a chromium (III) salt. The document describes that this chromium (III) carbonate is light green. Chromium (III) carbonate obtained in this manner is a precipitate as described in the document, and therefore, it cannot be used as a source of trivalent chromium.

CITATION LIST

Patent Documents

Patent Document 1: Japanese Patent Laid-Open No. 9-95793 (p. 2)
Patent Document 2: Japanese Patent Laid-Open No. 2002-322599 (CLAIMS)
Patent Document 3: Japanese Patent Laid-Open No. 2006-249518
Patent Document 4: Japanese Patent Laid-Open No. 52-35794 (CLAIMS, p. 1 and p. 2)
Patent Document 5: Japanese Patent Laid-Open No. 53-132499 (CLAIMS, p. 1 and p. 2)
Patent Document 6: Japanese Patent Laid-Open No. 2-92828 (CLAIMS, p. 1 and p. 2)

Non-Patent Document

Non-Patent Document 1: Encyclopaedia Chimica, Vol. 5, compact edition, 34th impression, KYORITSU SHUPPAN CO., LTD., Jun. 1, 1993, p. 723

DISCLOSURE OF THE INVENTION

Problems to be Solved by the Invention

It is an object of the present invention to provide chromium (III) carbonate useful as a source of trivalent chromium.

Means for Solving the Problems

The present invention provides chromium (III) carbonate characterized by exhibiting a light blue color in a solid state and having an L* value of 50 to 70, an a* value of −4 to −2, and a b* value of −10 to −7, which are represented by an L*a*b* color system (JIS Z8729).

Also, the present invention provides a process for producing chromium (III) carbonate characterized by comprising simultaneously adding an aqueous solution of carbonate and an aqueous solution containing trivalent chromium to an aqueous medium under the condition of a reaction liquid temperature of 0° C. or more and less than 50° C. to produce chromium carbonate.

Advantages of the Invention

The present invention provides chromium (III) carbonate that has high solubility in an acidic aqueous solution, and also has excellent solubility after storage in a solid state for a long period. By using the chromium (III) carbonate of the present invention as a source of trivalent chromium, the time of the preparation of a trivalent chromium plating liquid can be reduced. Also, it is possible to prevent adverse effect on a plating coating due to undissolved chromium hydroxide, which is an inconvenience that tends to occur when chromium hydroxide is used as a source of trivalent chromium. Also, when a liquid containing trivalent chromium, using the chromium (III) carbonate of the present invention, is used for metal surface treatment, for example, chromium plating and trivalent chromium chemical conversion treatment, the counteranions of the source of trivalent chromium are not accumulated in the plating liquid and the like, and therefore, it is easy to keep the composition of the plating liquid and the like constant. Also, the time of the preparation of the plating liquid and the like is significantly reduced, and therefore, the effect on related industries is large.

DESCRIPTION OF EMBODIMENTS

The present invention will be described below based on the preferred embodiment of the present invention. In the following description, chromium means trivalent chromium unless otherwise specified. The chromium (III) carbonate of the present invention is represented by the general formula: $Cr_2O_3 \cdot mCO_2 \cdot nH_2O$, wherein m represents a number of 0.25 to 2, and n represents a number of 4 to 6. This formula is an expression in which a carbonate radical or carbonate radicals and water are added to dichromium trioxide, but the present inventors presume that this is for convenience, and the chromium (III) carbonate of the present invention is in a state in which some of the hydroxyl groups of chromium hydroxide are substituted with carbonate radicals.

One characteristic of the chromium (III) carbonate of the present invention is that it exhibits a light blue color in a solid state. On the other hand, chromium (III) carbonate obtained by conventional processes exhibits a blue-green color or a light green color in a solid state. As a result of the study of the present inventors, it has been found that chromium (III) carbonate exhibiting a light blue color in a solid state has high solubility in an acid, though the reason is presently unclear. On the other hand, conventional chromium (III) carbonate exhibiting a blue-green color or a light green color in a solid state is poorly soluble or insoluble in an acid. When the color of the chromium (III) carbonate of the present invention in a solid state is represented by the $L^*a^*b^*$ color system (JIS Z8729), $L^*$=50 to 70, preferably 54 to 65, $a^*$=−4 to −2, preferably −3.6 to −2.2, and $b^*$=−10 to −7, preferably −9 to −8.

The above $L^*a^*b^*$ color system can be measured by using a spectrocolorimeter (manufactured by Nippon Denshoku Industries Co., Ltd., SE2000) for the sample.

Another characteristic of the chromium (III) carbonate of the present invention is that it is insoluble or poorly soluble in pure water, but has high solubility in an acidic aqueous solution (for example, an acidic aqueous solution having a pH of 2 or less). Moreover, its solubility is maintained even after long-term storage, particularly, even after storage in the state of a dry powder. Worthy of special mention is that the solubility in a powder state is high even after storage in the state of a dry powder. The present inventors presume that the reason is that the chromium (III) carbonate of the present invention has a carbonate radical in its structure. On the other hand, conventionally obtained chromium hydroxide changes over time during long-term storage, and easily transitions to hydroxide poorly soluble in an aqueous solution of an acid or an alkali. The cause is not exactly clear, but is considered to be that the chromium hydroxide transitions to a poorly soluble form due to the olation and oxo synthesis of chromium. Therefore, when a chromium plating liquid is prepared, stirring must be performed for a long time until chromium hydroxide is completely dissolved.

The chromium (III) carbonate of the present invention, and chromium (III) carbonate obtained by conventional production processes are distinguished by a difference in color in a solid state, and are also distinguished by a difference in dissolution properties due to the difference in color, as described above. In other words, conventional chromium (III) carbonate is not dissolved at all, or is not completely dissolved unless after 2 hours or more, when an amount corresponding to a Cr content of 1 g is added to 1 liter of an aqueous solution of hydrochloric acid having a pH of 0.2 at a temperature of 25° C., while the chromium (III) carbonate of the present invention is completely dissolved within 30 minutes. Therefore, the chromium (III) carbonate of the present invention can be used as a source of trivalent chromium or a supplementary liquid used for metal surface treatment, such as chromium plating and trivalent chromium chemical conversion treatment, unlike conventional chromium (III) carbonate. In this specification, the "trivalent chromium chemical conversion treatment" refers to treatment in which an aqueous solution containing a trivalent chromium salt as the main component, and a material to be treated are contacted to chemically produce a coating containing trivalent chromium on the material to be treated.

High solubility in this specification means that when chromium (III) carbonate in an amount corresponding to a Cr content of 1 g is added to 1 liter of an aqueous solution of hydrochloric acid having a pH of 0.2 at a temperature of 25° C., the chromium (III) carbonate is completely dissolved within 30 minutes. The dissolution of the chromium (III) carbonate is visually determined. The time of the dissolution of the chromium (III) carbonate is time until the liquid becomes transparent. The solubility of the chromium (III) carbonate should satisfy the above-described conditions, at least immediately after its production. The conditions of the dissolution of the chromium (III) carbonate are not particularly limited. Chromium (III) carbonate that is completely dissolved within 30 minutes in the state of still standing is within the range of the present invention, and chromium (III) carbonate that is completely dissolved within 30 minutes under any stirring is also within the range of the present invention. The conditions of the stirring are not particularly limited, and gentle stirring may be used, or vigorous stirring may be used. The stirring means also is not particularly limited, and, for example, stirring using a stirring blade or a stirring bar, and stirring using gas bubbling can be used. As one example, when a magnetic stirrer is used for the stirring, the number of revolutions of the stirring can be appropriately set in a range that the liquid does not spill out of the container. For example, about 100 to 500 rpm can be used.

The chromium (III) carbonate of the present invention is obtained by contacting an aqueous solution of carbonate and an aqueous solution containing trivalent chromium at a pH of preferably 6 to 12, more preferably 6 to 10, and further preferably 7 to 8, and at a temperature of 0° C. or more and less than 50° C. The chromium (III) carbonate of the present invention is in the form of fine particles such that the average particle diameter D of the primary particles is preferably 1000 nm or less, and more preferably 50 to 500 nm. Also, the chromium (III) carbonate of the present invention may be an aggregate in which the above primary particles aggregate. In the case of the aggregate, when the volume average particle diameter MV measured by a particle size distribution measurement apparatus is 100 μm or less, particularly 3 to 50 μm, change over time (decrease in solubility) when the chromium (III) carbonate is stored for a long period is reduced, and better solubility can be kept. Therefore, such a case is preferred. The primary particle diameter is represented as the average value of the particle diameter of 200 primary particles of the chromium (III) carbonate measured with a scanning electron microscope (SEM) image. MV is measured by a laser diffraction scattering type particle size distribution measurement apparatus after the chromium (III) carbonate is sufficiently dispersed in water by a household mixer or the like.

As a result of the study of the present inventors, it has been found that in the chromium (III) carbonate of the present invention, when the molar ratio $CO_2/Cr$ of $CO_2$ to Cr is 0.65 to 1, particularly 0.7 to 0.8, the solubility in an acidic aqueous solution is very good.

The particle shape of the chromium (III) carbonate of the present invention is not particularly limited. The particle shape is generally a spherical shape, but can also be a shape, such as a massive shape, in addition.

The chromium (III) carbonate of the present invention is generally in the state of a dry powder or in the state of a slurry of the chromium (III) carbonate suspended in water. In terms of increasing the solubility in an acidic aqueous solution, the chromium (III) carbonate is preferably continuously in the state of a slurry from immediately after the preparation of the chromium (III) carbonate. However, in terms of handleability and the like, the chromium (III) carbonate of the present invention is very advantageous in that even if it is stored in the state of a dry powder for a long period, the decrease in solubility is small.

When chromium (III) carbonate is stored in a slurry state, components other than the chromium carbonate may be contained or may not be contained in the slurry. When components other than the chromium (III) carbonate are contained in the slurry, the components include Na, K, Cl, $SO_4$, $NH_4$, and the like. When the slurry is used as a supplementary liquid for a liquid used for metal surface treatment, for example, chromium plating and trivalent chromium chemical conversion treatment, the slurry preferably contains substantially no impurity ions to prevent the accumulation of unnecessary ions due to supplement. The "impurity ions" in this specification mean ions other than $H^+$ and $OH^-$ ions. "Contains substantially no" means that impurity ions are not intentionally added during the preparation of the chromium (III) carbonate and the preparation of the slurry using the chromium (III) carbonate, and is intended to allow a slight amount of impurity ions unavoidably mixed. Therefore, in addition to pure water and ion exchange water, tap water, industrial water, and the like containing substantially no impurity ions may be used as water used for the preparation of the chromium (III) carbonate and the preparation of the slurry using the chromium (III) carbonate.

Next, a preferred process for producing chromium (III) carbonate according to the present invention will be described. One characteristic of the production process of the present invention is simultaneous addition of an aqueous solution of carbonate and an aqueous solution containing trivalent chromium. The present inventors have known that by simultaneously adding these aqueous solutions to an aqueous medium, the contact of the aqueous solution of carbonate and the aqueous solution containing trivalent chromium can be performed at a pH of 6 to 12, and unexpectedly, chromium (III) carbonate having high solubility in an acidic aqueous solution can be obtained. On the other hand, in conventional processes for producing chromium hydroxide or chromium carbonate, for example, the production processes described in Patent Documents 4 and 6 and Non-Patent Document 1, simultaneous addition is not used, and instead, an alkali, such as sodium hydroxide or alkali carbonate, is added to the aqueous solution containing trivalent chromium to produce chromium hydroxide or chromium carbonate. Chromium hydroxide or chromium carbonate obtained by this process has poor solubility in an acidic aqueous solution.

The aqueous solution of carbonate and the aqueous solution containing trivalent chromium are substantially continuously added to the aqueous medium. Substantially continuously is intended to allow a case where the addition is unavoidably temporarily discontinuous due to a fluctuation in production conditions, and the like.

In the simultaneous addition of the aqueous solution of carbonate and the aqueous solution containing trivalent chromium, both aqueous solutions are substantially simultaneously added at the start of operation, though the addition of the aqueous solution of carbonate may precede the addition of the aqueous solution containing trivalent chromium, or on the contrary, the addition of the aqueous solution containing trivalent chromium may precede the addition of the aqueous solution of carbonate, to the extent of not impairing the effect of the present invention. At the completion of operation, similarly, the addition of both aqueous solutions are substantially simultaneously completed, but the completion of the addition of the aqueous solution of carbonate may precede the completion of the addition of the aqueous solution containing trivalent chromium, or on the contrary, the completion of the addition of the aqueous solution containing trivalent chromium may precede the completion of the addition of the aqueous solution of carbonate, to the extent of not impairing the effect of the present invention.

The aqueous solution of carbonate and the aqueous solution containing trivalent chromium are simultaneously added to the aqueous medium. The aqueous medium used in the present invention preferably has a pH in the neutral range (a pH of about 7) to the alkaline range (a pH of greater than 7 to 14 or less). It is also possible to use an aqueous medium having a pH in the acidic range, but considering that the produced chromium (III) carbonate has good solubility, it is advantageous to use an aqueous medium having a pH in the neutral range to the alkaline range.

For example, water (pure water (at a pH of about 7), tap water (at a pH of slightly less than 7) and the like) and an aqueous solution of a neutral salt can be used as the aqueous medium having a pH of about 7 in the neutral range. For example, sodium chloride and the like can be used as the neutral salt. For example, ammonia water can be used as the aqueous medium having a pH in the alkaline range. Also, the aqueous medium can contain a water-soluble organic solvent, such as lower alcohol, as required, whether its pH is in the neutral range or the alkaline range. Among these aqueous media, water (pure water, tap water and the like) is preferably used from the viewpoint that the mixing of unnecessary chemical species can be prevented in the preparation of a chromium plating liquid and the like.

The solubility of the produced chromium (III) carbonate is also affected by the temperature of the reaction liquid, in addition to simultaneously adding the aqueous solution of carbonate and the aqueous solution containing trivalent chromium. The reaction liquid herein is a liquid obtained by adding the aqueous solution of carbonate and the aqueous solution containing trivalent chromium to the aqueous medium. If the temperature of the reaction liquid is higher than 50° C., the produced chromium (III) carbonate becomes an aggregate or massive easily, and therefore, chromium carbonate having high solubility is not obtained. If the temperature of the reaction liquid is less than 0° C., the trivalent chromium salt and/or carbonate may be deposited. When the temperature of the reaction liquid is 10 to 50° C., particularly 10 to 40° C., chromium (III) carbonate having high solubility is more easily obtained, and therefore, such temperature is preferred.

The reaction of the aqueous solution of carbonate and the aqueous solution containing trivalent chromium is neutralization reaction, and therefore, chromium (III) carbonate having the desired properties is obtained by mixing both aqueous solutions in the aqueous medium. During the reaction with the simultaneous addition, preferably, the reaction liquid is stirred to allow reaction to occur uniformly and promote reaction. If the stirring is insufficient, the amount of the trivalent chromium may be locally excessive with respect to the amount of the alkali in the reaction liquid. Chromium (III) carbonate produced in such a state has poor solubility in an acidic aqueous solution. Therefore, it is important to perform the addition of the aqueous solution containing trivalent chromium so that the amount of the trivalent chromium is not locally excessive with respect to the amount of the alkali. From this viewpoint, it is preferred to adjust the stirring conditions so that the local occurrence of stagnant portions is avoided and uniform mixing can be performed. The state in which the amount of the trivalent chromium is locally excessive with respect to the amount of the alkali refers to, for example, a state in which the aqueous solution of the inorganic alkali is added to the aqueous solution containing trivalent chromium, as described in Patent Documents 4 and 6 and Non-Patent Document 1.

The concentration, addition speed, addition ratio, and the like of the aqueous solution of the inorganic alkali and the aqueous solution containing trivalent chromium are not particularly limited, but in terms of obtaining chromium (III) carbonate having high solubility, it is preferred to adjust these according to the ability of the stirrer and the production scale so that nonuniform mixing does not occur during the reaction. For preferred concentration, the concentration of carbonate ions in the aqueous solution of carbonate is 0.05 to 5 mol/l, particularly 0.1 to 3 mol/l, and the concentration of trivalent chromium in the aqueous solution containing trivalent chromium is 0.05 to 5 mol/l, particularly 0.1 to 3 mol/l. Conditions, such as addition speed, are not particularly limited, but when addition is performed under the condition that the molar ratio ($CO_3$/Cr) of $CO_3$ in the aqueous solution of carbonate to Cr in the aqueous solution containing trivalent chromium is 2.0 to 3.5, particularly 2.5 to 3.0, a satisfactory result is obtained. Therefore, such a condition is preferred.

It is preferred to adjust the concentration, addition ratio, and addition speed of the aqueous solution of carbonate and the aqueous solution containing trivalent chromium so that the pH of the reaction liquid while these aqueous solutions are added is maintained at 6 to 12, particularly 6 to 10, more particularly 7 to 8. By maintaining the pH during the reaction in this range, chromium (III) carbonate having the target solubility can be successfully produced.

A water-soluble trivalent chromium salt can be used, without particular limitation, as the source of chromium in the aqueous solution containing trivalent chromium. Such a salt includes, for example, chromium chloride, chromium sulfate, chromium ammonium sulfate, chromium potassium sulfate, chromium formate, chromium fluoride, chromium perchlorate, chromium sulfamate, chromium nitrate, and chromium acetate. One of these salts can be used, or two or more of these salts can be used in combination. These salts may be used in the state of an aqueous solution or in the state of a powder. For example, "35% Liquid Chromium Chloride" and "40% Liquid Chromium Sulfate" (product names) manufactured by Nippon Chemical Industrial Co., Ltd., and commercially available chromium chloride (crystalline product) can be used. Among these salts, chromium chloride and chromium sulfate are preferably used in terms of no residual organic substance, and economy.

As the aqueous solution containing trivalent chromium, one obtained by reducing hexavalent chromium in an aqueous solution containing hexavalent chromium to trivalent chromium can also be used. For example, an aqueous solution obtained by passing a sulfurous acid gas through an aqueous solution of dichromate to reduce hexavalent chromium to trivalent chromium can be used. Alternatively, an aqueous solution obtained by adding sulfuric acid to an aqueous solution of dichromate to reduce hexavalent chromium to trivalent chromium with an organic substance can also be used.

The carbonate used in the aqueous solution of carbonate simultaneously added with the aqueous solution containing trivalent chromium is used in a broad sense including carbonate and hydrogencarbonate in a narrow sense. The carbonate includes alkali metal salts and ammonium salts of carbonic acid, alkali metal salts and ammonium salts of bicarbonic acid, and the like, specifically, sodium carbonate, potassium carbonate, ammonium carbonate, sodium hydrogencarbonate, potassium hydrogencarbonate, ammonium hydrogencarbonate, and the like.

When chromium (III) carbonate is produced by simultaneously adding the aqueous solution containing trivalent chromium and the aqueous solution of carbonate, the slurry is filtered to separate the chromium (III) carbonate as a solid, and the chromium (III) carbonate is washed. A usual method can be used for the filtration. For example, suction filtration using a Buchner funnel can be performed. The washing after the filtration is performed using water. For example, the washing can be performed by adding water to the cake on the Buchner funnel for repulping, and further performing suction filtration, and the like. The washing is preferably performed until the conductivity of the filtrate is, for example, 5 mS/cm or less. A high conductivity of the filtrate means that a large amount of by-product salts derived from the raw materials remain in the chromium (III) carbonate after the washing. Such by-product salts should be removed as much as possible because when the chromium (III) carbonate is used as a source of chromium in a trivalent chromium plating liquid, the by-product salts are accumulated in the plating liquid. Therefore, the washing is preferably performed until the conductivity of the filtrate is the above value or less. Also, the filtration and the washing are preferably performed at a low temperature of preferably 0 to 50° C., more preferably 20 to 40° C., because the olation and oxo synthesis of chromium, and the resulting production of a poorly soluble substance can be prevented.

After the washing, the chromium (III) carbonate is dried to be in a powder state, or water is added to the chromium (III) carbonate to provide a slurry having a predetermined concentration (for example, a Cr concentration of 1 to 10 weight %). When the color of the chromium (III) carbonate of the present invention in a slurry state (Cr concentration: 4 weight %) is represented by the $L^*a^*b^*$ color system, preferably, $L^*$=25 to 50, particularly 30 to 45, $a^*$=−10 to −2, particularly −8.5 to −2.0, and $b^*$=−16 to −8, particularly −15.5 to −9.5. As described previously, the chromium (III) carbonate of the present invention has an advantage that even if it is stored in the air in the state of a dry powder, it has high solubility in an acid, in a powder state as it is. Being able to be stored in a powder state is more advantageous than being stored in a slurry state, in terms of excellent handleability and conveyance properties.

It is preferred to add a reducing agent during the above reaction, or after the completion of the reaction. Thus, even if the reaction liquid or the chromium (III) carbonate is placed in an oxidation atmosphere during the reaction or during storage (during storage in a slurry state), reoxidation can be prevented, and therefore, the production of hexavalent chromium can be prevented. Particularly, it is preferred to add a reducing agent after the completion of the reaction, from the viewpoint that reoxidation can be surely prevented. Organic or inorganic reducing agents conventionally used in the art can be used, without particular limitation, as the reducing agent. For example, monohydric alcohol, such as methyl alcohol and propyl alcohol, and dihydric alcohol, such as ethylene glycol and propylene glycol, are suitably used as the organic reducing agent. Other organic reducing agents include monosaccharides, such as glucose, disaccharides, such as maltose, polysaccharides, such as starch, and the like. The inorganic reducing agents include, for example, hydrazine, hydrogen peroxide, and the like.

The chromium (III) carbonate obtained in this manner has high solubility in an acidic aqueous solution, and therefore, the chromium (III) carbonate can be added to and dissolved in an acidic aqueous solution, in a powder state, or by adding water to the chromium (III) carbonate to be in a slurry state, thereby, an aqueous solution of a salt of the corresponding acid (an inorganic acid chromium (III) salt or an organic acid chromium (III) salt) can be easily obtained. The concentration and the like of the acid aqueous solution can be appropriately determined according to the type and application of the acid used.

An aqueous solution of an inorganic acid or an organic acid is used as the above acidic aqueous solution. The aqueous solution of the inorganic acid includes an aqueous solution of an inorganic acid, for example, nitric acid, phosphoric acid, hydrochloric acid, sulfuric acid, and hydrofluoric acid. The aqueous solution of the organic acid includes an aqueous solution of an organic acid, such as formic acid, acetic acid, glycolic acid, lactic acid, gluconic acid, oxalic acid, maleic acid, malonic acid, malic acid, tartaric acid, succinic acid, citric acid, fumaric acid, and butyric acid.

In terms of dissolving the chromium (III) carbonate easily and surely, the aqueous solution of the inorganic acid or the aqueous solution of the organic acid preferably has low pH, specifically, preferably a pH of 2 or less, and more preferably a pH of 1 or less. The concentration of the inorganic acid or the organic acid in the aqueous solution of the inorganic acid or the aqueous solution of the organic acid is preferably in the range of 1 to 50% by weight, particularly 5 to 50% by weight. Also, in terms of dissolving the chromium (III) carbonate easily and surely, it is preferred to use the chromium (III) carbonate corresponding to 1 g or less of Cr, with respect to 1 liter of the aqueous solution of the inorganic acid or the aqueous solution of the organic acid.

The dissolution of the chromium (III) carbonate in the aqueous solution of the inorganic acid or the aqueous solution of the organic acid is preferably performed at 25 to 90° C.

The inorganic acid chromium salt obtained in this manner includes chromium hydrochloride, chromium nitrate, chromium phosphate, chromium sulfate, chromium fluoride, and the like. These inorganic acid chromium salts may be basic salts. For example, chromium nitrate is a compound represented by the composition formula $Cr(OH)x(NO_3)y$, wherein $0 \leq x \leq 2$, $1 \leq y \leq 3$, and $x+y=3$, and the compound also includes basic chromium nitrate, such as $Cr(OH)_{0.5}(NO_3)_{2.5}$, $Cr(OH)(NO_3)_2$, and $Cr(OH)_2(NO_3)$, in addition to chromium nitrate, which is a normal salt represented by $Cr(NO_3)_3$.

The organic acid chromium salt is a compound represented by the general formula $Cr_m(A^x)_n$. In the above general formula, A represents a residue obtained by removing a proton from an organic acid. A has a negative charge. x represents the charge of A (negative charge). m and n each represents an integer satisfying $3m+xn=0$.

The organic acid in the organic acid chromium salt is represented by $R(COOH)_y$, wherein R represents an organic group, a hydrogen atom, or a single bond or a double bond; and y represents the number of carboxyl groups in the organic acid and is an integer of 1 or more, preferably 1 to 3. A in the above general formula is represented by $R(COO^-)_y$. When R is an organic group, the organic group is preferably an aliphatic group having 1 to 10 carbon atoms, particularly 1 to 5 carbon atoms. This aliphatic group may be substituted with other functional groups, for example, a hydroxyl group. Both of a saturated aliphatic group and an unsaturated aliphatic group can be used as the aliphatic group.

Also, the chromium (III) carbonate produced according to the process of the present invention can be added to and dissolved in an aqueous solution containing two or more acids, in a powder state, or by adding water to the chromium (III) carbonate to be in a slurry state, to provide an aqueous solution containing a source of chromium (III). The concentration and used amount of the chromium (III) carbonate and the aqueous solution of the acids, the combination of the acids used, and the compounding ratio of the acids can be appropriately determined according to the type and application of the target source of chromium (III).

The type of the aqueous solution of the acids in which the chromium (III) carbonate is dissolved may be a combination of organic acids, a combination of inorganic acids, or a solution containing both an organic acid and an inorganic acid. The organic acid and the inorganic acid that can be used include those similar to those described previously.

The process for producing an aqueous solution of two or more acids containing a source of chromium (III) according to the present invention should follow the process for producing an aqueous solution of an inorganic acid chromium salt or an organic acid chromium salt described above, and therefore, detailed description of the production process is omitted here. The outline is described. For example, the following methods 1) to 3) can be used for the dissolution of chromium (III) carbonate in an aqueous solution of acids, but the dissolution is not limited to these methods.

1) A method in which an aqueous solution of acids in which the desired two or more acids are previously dissolved is prepared, and chromium (III) carbonate is added to the aqueous solution to dissolve the chromium (III) carbonate in the acid solution;

2) A method in which an acid of one component among the desired acids is previously appropriately selected, next, the selected acid is dissolved in water to prepare an aqueous solution of the acid, next, chromium (III) carbonate is added to the obtained aqueous solution of the acid to perform primary dissolution treatment, and an acid (acids) of the remaining component(s) is added to the obtained aqueous solution to perform secondary dissolution treatment; or 3) A method in which an aqueous solution of acids in which part of the required amount of the desired two or more acids is previously dissolved in water is prepared, next, chromium (III) carbonate is added to the obtained aqueous solution of the acids to perform primary dissolution treatment, and the remaining amount of the acids are added to the obtained aqueous solution to perform secondary dissolution treatment to dissolve the chromium (III) carbonate.

The source of chromium (III) of the present invention obtained in this manner is a complex chromium (III) salt having two or more acid radicals bonded to chromium, represented by the following formula. The type of acids bonded to chromium may be selected from a combination of organic acids, a combination of inorganic acids, or both of an organic acid and an inorganic acid.

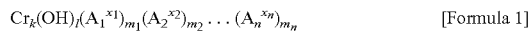

$$Cr_k(OH)_l(A_1^{x1})_{m_1}(A_2^{x2})_{m_2}\ldots(A_n^{xn})_{m_n} \quad \text{[Formula 1]}$$

wherein $A_1, A_2, \ldots, A_n$ represent two or more acid residues obtained by removing a proton from an acid selected from the group consisting of an inorganic acid and an organic acid. When phosphoric acid is used as the acid, the above acid residue is represented by $H_2PO_4^-$ and/or $HPO_4^{2-}$. $x_1, x_2, \ldots, x_n$ represent a charge. However, $A_1, A_2, \ldots, A_n$ are not the same acid radical. $k, l, m_1, m_2, \ldots, m_n$ represent a real number satisfying $3k-l+x_1m_1+x_2m_2+\ldots+x_nm_n=0$.

In the above formula, the ratio of the above $H_2PO_4^-$ and $HPO_4^{2-}$ when phosphoric acid is used as the acid is arbitrarily changed by the reaction conditions, the raw material system, and the like.

The chromium (III) carbonate of the present invention has high solubility in an acidic aqueous solution as described above and is therefore useful as, for example, a source of trivalent chromium in a metal surface treatment liquid, for example, chromium plating liquid and a trivalent chromium chemical conversion treatment liquid using trivalent chromium, as described below. By using the chromium (III) carbonate of the present invention as a source of trivalent chromium, the time of the preparation of the plating liquid and the treatment liquid can be reduced. Also, undissolved chromium (III) carbonate is not present in the plating liquid and the treatment liquid, and therefore, a good-quality plating coating and trivalent chromium coating can be formed.

The present invention also provides a liquid containing trivalent chromium, using the above-described chromium (III) carbonate having high solubility as a source of chromium. The liquid containing (III) carbonate according to the present invention is used for final finish for decoration and for industrial trivalent chromium plating. Also, the liquid containing chromium (III) carbonate is used for the surface treatment of various metals, such as plating provided on the surface of metal, including the surface of metal, which is a substrate, the surface of nickel plating formed on plastic, which is a substrate, and the like. Further, the liquid containing chromium (III) carbonate is used for trivalent chromium chemical conversion treatment for the surface of plating, such as zinc plating and tin plating. In other words, the liquid containing trivalent chromium according to the present invention can be a trivalent chromium plating liquid and a trivalent chromium chemical conversion treatment liquid. In the following description, these liquids are collectively called "a plating liquid and the like" unless otherwise specified.

When the liquid containing trivalent chromium according to the present invention is used as a trivalent chromium plating liquid, the trivalent chromium plating liquid contains trivalent chromium derived from the above-described chromium (III) carbonate, and other components, including an organic acid and the like. When the liquid containing trivalent chromium according to the present invention is used as a treatment liquid for trivalent chromium chemical conversion treatment, the treatment liquid uses the above-described chromium (III) carbonate as a source of chromium and can further contain a cobalt compound, a silicon compound, a zinc compound, various organic acids, and the like.

The cobalt compound used for the above trivalent chromium chemical conversion treatment liquid includes cobalt chloride, cobalt nitrate, cobalt sulfate, cobalt phosphate, cobalt acetate, and the like. One of these can be used, or two or more of these can also be mixed and used. The silicon compound includes colloidal silica, sodium silicate, potassium silicate, and lithium silicate. One of these silicon compounds can be used, or two or more of these silicon compounds can also be mixed and used. The zinc compound includes zinc chloride, zinc sulfate, zinc nitrate, zinc oxide, zinc carbonate, zinc phosphate, zinc acetate, and the like. One of these zinc compounds can be used, or two or more of these zinc compounds can also be mixed and used. The organic acid includes oxalic acid, malonic acid, succinic acid, citric acid, adipic acid, tartaric acid, malic acid, glycine, and the like. It is considered that since these exhibit chelating action, the trivalent chromium can be held in the plating liquid in a stable form.

The above trivalent chromium chemical conversion treatment liquid preferably contains 0.005 to 1.0 mole/liter, for example, of chromium. The molar ratio of the organic acid to the chromium is preferably 1 to 5 moles with respect to 1 mole of the chromium.

The present invention also provides, in addition to the above-described plating liquid and the like, a supplementary liquid for a plating liquid and the like used for metal surface treatment, for example, chromium plating and trivalent chromium chemical conversion treatment. This supplementary liquid comprises a slurry containing the above-described chromium (III) carbonate. This slurry preferably contains no impurity ions as described above. In chromium plating, trivalent chromium chemical conversion treatment, and the like, inorganic anions, for example, sulfate ions, nitrate ions, and chloride ions, are not taken in the coating and remain in the liquid. Therefore, when the source of chromium is additionally poured into the plating liquid and the like, inorganic anions that are the counteranions of the source of chromium are gradually accumulated in the plating liquid and the like, and the composition of the plating liquid and the like is changed. On the other hand, the supplementary liquid comprising the slurry containing the above-described chromium (III) carbonate does not contain these anions, and therefore, even if the supplementary liquid is additionally poured into the plating liquid and the like as a source of chromium, the change in the composition of the plating liquid and the like is small. As a result, the plating liquid and the like can be used for a long period without frequently renewing the plating liquid and the like.

The type of the plating liquid and the like to which the source of chromium is supplied by the above supplementary liquid is not particularly limited, and a plating liquid and the like containing trivalent chromium conventionally used can be used.

A suitable amount of the supplementary liquid of the present invention is added to the plating liquid and the like according to the extent of the consumption of chromium ions in the plating liquid and the like, while chromium plating and trivalent chromium chemical conversion treatment are performed. The addition may be continuous or intermittent.

The present invention has been described based on the preferred embodiment of the present invention. However, the present invention is not limited to the above embodiment, and various modifications can be made within the common sense of those skilled in the art. Such modifications fall within the scope of the present invention.

EXAMPLES

The present invention will be specifically described below by way of Examples. "%" means "% by weight" unless otherwise specified.

Example 1

500 g of a 10% aqueous solution of sodium carbonate, and 85.4 g of a 35% aqueous solution of chromium chloride (manufactured by Nippon Chemical Industrial Co., Ltd.) were each placed in a container and prepared. Next, the aqueous solution of sodium carbonate was adjusted to 20° C., and the aqueous solution of chromium chloride was adjusted to 20° C. The aqueous solution of sodium carbonate and the aqueous solution of chromium chloride were simultaneously added into pure water adjusted to 20° C. The addition speed was 10 g/min for the aqueous solution of sodium carbonate and 1.7 g/min for the aqueous solution of chromium chloride. The addition was continuously performed. The addition was performed for 50 minutes. During the addition, the pH of the reaction liquid was maintained at about 7. During the addition, the temperature of the reaction liquid was maintained at 20 to 30° C. During the addition, the reaction liquid was stirred (300 rpm) so that the amount of trivalent chromium was not locally excessive with respect to the amount of sodium carbonate. A precipitate produced by the reaction was filtered and washed with water at 30° C., until the conductivity of the filtrate was 1 mS/cm, to obtain a chromium (III) carbonate cake. This chromium (III) carbonate cake was dried in a vacuum at 40° C. for 48 hours. A light blue chromium (III) carbonate powder having a water content of 18.6% was obtained in this manner. The MV and D and L*a*b* of the obtained chromium (III) carbonate were as shown in Table 1. The solubility when the chromium (III) carbonate corresponding to a Cr content of 1 g was added to 1 liter of an aqueous solution of hydrochloric acid having a pH of 0.2 at a temperature of 25° C. (immediately after the production of the chromium (III) carbonate, and after storage for 90 days, the number of revolutions of a magnetic stirrer: 200 rpm) was as shown in Table 1.

The identification of the obtained chromium (III) carbonate was performed by the following method. For $Cr_2O_3$, Cr was quantified by potentiometric titration and converted into $Cr_2O_3$. In the potentiometric titration, chromium (III) in the sample was oxidized with perchloric acid to chromium (VI), and then, titration was performed with an ammonium ferrous sulfate solution. For $CO_2$, according to JIS R9011, the sample was decomposed with hydrochloric acid, the produced $CO_2$ was introduced into an aqueous solution of barium chloride and sodium hydroxide for absorption, and titration was performed with a hydrochloric acid standard solution for quantification. For $H_2O$, the loss on drying (%) of the sample was measured, and $H_2O$ was calculated from 100−$Cr_2O_3$(%)−$CO_2$(%)−loss on drying (%). The loss on drying was obtained by drying the sample in a dryer at 110° C. for 2 hours, then measuring the weight, and subtracting the weight after drying from the weight before drying. The result of the identification is shown in Table 1.

Example 2

731 g of a 20% aqueous solution of potassium carbonate was used instead of the 10% aqueous solution of sodium carbonate used in Example 1, and was simultaneously added with chromium chloride at an addition speed of 14.6 g/min. The pH of the reaction liquid was maintained at about 8. Except these, a light blue chromium (III) carbonate powder was obtained as in Example 1. Measurement as in Example 1 was performed for the obtained chromium (III) carbonate. The results are shown in the following Table 1.

TABLE 1

|  |  | Example 1 | Example 2 |
|---|---|---|---|
| MV (μm) |  | 9.8 | 14.8 |
| D (nm) |  | 355 | 137 |
| Solubility (min) | Immediately after production | 18 | 24 |
|  | After 90 days | 26 | 27 |
| $Cr_2O_3$ (%) |  | 38.6 | 40.1 |
| $CO_2$ (%) |  | 17.1 | 18.2 |
| $H_2O$ (%) |  | 25.7 | 25.0 |
| $CO_2$/Cr molar ratio |  | 0.77 | 0.78 |
| L* |  | 60.93 | 58.93 |
| a* |  | −3.08 | −2.80 |
| b* |  | −8.19 | −8.36 |

Example 3

Reaction was performed as in Example 1 to obtain a light blue chromium (III) carbonate cake. This chromium (III) carbonate cake was suspended in pure water to obtain 245 g of a slurry having a Cr concentration of 4%. Measurement as in Example 1 was performed for the obtained chromium (III) carbonate slurry. The results are shown in the following Table 2.

Example 4

Except that the amount of the 10% aqueous solution of sodium carbonate was changed to 625 g to maintain the pH of the reaction liquid at 6, reaction was performed as in Example 1 to obtain a light blue chromium (III) carbonate cake. This chromium (III) carbonate cake was suspended in pure water to obtain 245 g of a slurry having a Cr concentration of 4%. Measurement as in Example 1 was performed for the obtained chromium (III) carbonate slurry. The results are shown in the following Table 2.

TABLE 2

|  |  | Example 3 | Example 4 |
|---|---|---|---|
| MV (μm) |  | 9.8 | 26.7 |
| D (nm) |  | 355 | 348 |
| Solubility (min) | Immediately after production | 20 | 30 |
|  | After 90 days | 24 | 29 |
| $Cr_2O_3$ (%) |  | 5.57 | 5.47 |
| $CO_2$ (%) |  | 2.47 | 2.33 |
| $H_2O$ (%) |  | 3.86 | 3.48 |
| $CO_2$/Cr molar ratio |  | 0.77 | 0.74 |
| L* |  | 42.08 | 31.68 |
| a* |  | −2.67 | −2.30 |
| b* |  | −13.55 | −12.67 |

Comparative Example 1

70 g of a 20% aqueous solution of sodium hydroxide, and a 7% aqueous solution of chromium chloride obtained by adding 208 g of water to 52 g of a 35% aqueous solution of chromium chloride (manufactured by Nippon Chemical Industrial Co., Ltd.) for dilution were each placed in a container and prepared. Next, the temperature of the aqueous solution of sodium hydroxide and the aqueous solution of chromium chloride was adjusted to 20° C. The aqueous solution of sodium hydroxide was added to the aqueous solution of chromium chloride at a speed of 1.4 g/min, while the aqueous solution of chromium chloride was stirred. The produced precipitate was filtered and washed with water to obtain a chromium hydroxide cake. This chromium hydroxide cake was dried in a vacuum at 40° C. for 48 hours. A green chromium hydroxide powder was obtained in this manner. Measurement as in Example 1 was performed for the chromium hydroxide. The results are shown in the following Table 3. However, the solubility was measured only immediately after the production.

Comparative Example 2

500 g of a 10% aqueous solution of sodium carbonate and 86.4 g of a 35% aqueous solution of chromium chloride (manufactured by Nippon Chemical Industrial Co., Ltd.) were each placed in a container and prepared. Next, the aqueous solution of sodium carbonate and the aqueous solution of chromium chloride were adjusted to a reaction temperature of 20° C. Unlike Example 1, the aqueous solution of sodium carbonate was added to the aqueous solution of chromium chloride at a speed of 10 g/min, while the aqueous solution of chromium chloride was stirred. The produced precipitate was filtered and washed with water to obtain a chromium (III) carbonate cake. This chromium (III) carbonate cake was dried in a vacuum at 40° C. for 48 hours to obtain a blue-green chromium (III) carbonate powder. Measurement as in Example 1 was performed for this chromium (III) carbonate. The results are shown in the following Table 3. However, the solubility was measured only immediately after the production.

TABLE 3

| | Comparative Example 1 | Comparative Example 2 |
|---|---|---|
| MV (μm) | 7.5 | 24.8 |
| D (nm) | 59 | 113 |
| Solubility (immediately after production, min) | >120 | >120 |
| $Cr_2O_3$ (%) | 49.3 | 39.2 |
| $CO_2$ (%) | >0.1 | 14.1 |
| $H_2O$ (%) | 25.2 | 29.3 |
| $CO_2$/Cr molar ratio | 0.00 | 0.62 |
| L* | 47.32 | 36.16 |
| a* | −10.75 | −2.93 |
| b* | −7.08 | −6.22 |

From the above results of Examples and Comparative Examples, it is found that the chromium (III) carbonate in Examples (the present invention) has high solubility in an acid, either in a powder state or in a slurry state. On the other hand, it is found that the chromium hydroxide in Comparative Example 1 and the chromium (III) carbonate in Comparative Example 2 prepared by adding the aqueous solution of the inorganic alkali to the aqueous solution containing trivalent chromium have low solubility in a powder state.

Example 5

A light blue chromium (III) carbonate powder was obtained as in Example 1. Then, the obtained chromium (III) carbonate powder was added and dissolved, in an amount corresponding to a Cr content of 1 g, in 1 liter of various aqueous solutions of inorganic acids at a temperature of 25° C., or in 1 liter of aqueous solutions of organic acids at a temperature of 50° C. to obtain aqueous solutions of inorganic acid chromium salts or aqueous solutions of organic acid chromium salts. The time required for the dissolution (unit: min) is shown in the following Table 4.

TABLE 4

| | Example 5 | |
|---|---|---|
| Type of acid | pH of aqueous solution of acid | Dissolution time (min) |
| Nitric acid | 0.4 | 5 |
| Phosphoric acid | 0.5 | 4 |
| Sulfuric acid | 0.4 | 8 |
| Oxalic acid | 0.6 | 20 |
| Formic acid | 0.5 | 27 |
| Malonic acid | 0.5 | 43 |
| Glycolic acid | 1.1 | 40 |

Examples 6 to 8

A light blue chromium (III) carbonate powder was obtained as in Example 1. Then, an amount corresponding to a Cr content of 1 g was added and dissolved in 1 liter of aqueous solutions containing two acids at a temperature of 25° C. to obtain aqueous solutions containing a source of chromium (III). The time required for the dissolution (unit: min) is shown in the following Table 5.

The composition of the aqueous solution of the acids used in each Example is as follows.

liquid A (pH: 0.2): 2.6% by weight of hydrochloric acid, 5.2% by weight of nitric acid liquid B (pH: 0.4): 2.5% by weight of sulfuric acid, 3.3% by weight of phosphoric acid liquid C (pH: 0.3): 2.6% by weight of hydrochloric acid, 2.2% by weight of oxalic acid

TABLE 5

| | Type of aqueous solution of acid | Dissolution time (min) |
|---|---|---|
| Example 6 | A | 5 |
| Example 7 | B | 5 |
| Example 8 | C | 18 |

Use Example 1

A plating liquid for trivalent chromium plating having the following composition was prepared in a square plating vessel having an internal volume of 8 liters. Chromium plating was performed under the conditions of a bath temperature of 50° C. and a current density of 40 A/dm$^2$, using a mild steel round bar as the material to be plated, and a carbon plate as the anode. The amount of chromium consumed and the concentration of chromium in the bath were calculated from the weight measurement of the round bar before and after the plating. When the concentration of chromium in the plating liquid decreased by 1 to 2 g/liter, the slurry of chromium (III) carbonate obtained in Example 1 was added to the plating liquid in an amount corresponding to the electrodeposited metal chromium, and chromium plating was continuously performed while the plating liquid was sufficiently stirred. As a result, good chromium plating was obtained.

(Composition of Plating Liquid)
Chromium chloride hexahydrate 300 g/L
Boric acid 30 g/L
Glycine 50 g/L
Ammonium chloride 130 g/L
Aluminum chloride hexahydrate 50 g/L

The invention claimed is:

1. A chromium (III) carbonate represented by $Cr_2O_3 \cdot mCO_2 \cdot nH_2O$, wherein m represents a number ranging from 0.25 to 2, and n represents a number ranging from 4 to 6, and the chromium (III) carbonate is characterized by exhibiting a light blue color in a solid state and having an $L^*$ value of 50 to 70, an $a^*$ value of −4 to −2, and a $b^*$ value of −10 to −7, which are represented by an $L^*a^*b^*$ color system (JIS Z8729).

2. The chromium (III) carbonate according to claim 1, wherein the chromium (III) carbonate is completely dissolved within 30 minutes when the chromium (III) carbonate is added, in an amount corresponding to a Cr content of 1 g, to 1 liter of an aqueous solution of hydrochloric acid having a pH of 0.2 at a temperature of 25° C.

3. The chromium (III) carbonate according to claim 1, obtained by contacting an aqueous solution of carbonate and an aqueous solution comprising trivalent chromium at a pH of 6 to 12 under the condition of a reaction liquid temperature of 0° C. or more and less than 50° C.

4. A slurry containing a chromium (III) carbonate, characterized in that the chromium (III) carbonate according to claim 1 is in a state of a slurry of the chromium (III) carbonate suspended in water, and that the slurry comprises substantially no impurity ion.

5. An aqueous solution of an inorganic acid chromium (III) salt or an aqueous solution of an organic acid chromium (III) salt, characterized by being obtained by dissolving the chromium (III) carbonate according to claim 1 in an aqueous solution of an inorganic acid or an aqueous solution of an organic acid, and being used for metal surface treatment.

6. An aqueous solution comprising a source of chromium (III), characterized by being obtained by dissolving the chromium (III) carbonate according to claim 1 in an aqueous solution comprising two or more acids, comprising a source of chromium (III), and being used for metal surface treatment.

7. A process for producing a chromium (III) carbonate represented by $Cr_2O_3 \cdot mCO_2 \cdot nH_2O$, wherein m represents a number ranging from 0.25 to 2, and n represents a number ranging from 4 to 6, characterized by simultaneously adding an aqueous solution of carbonate and an aqueous solution comprising trivalent chromium to an aqueous medium under the condition of a reaction liquid temperature of 0° C. or more and less than 50° C. to produce chromium carbonate.

8. The process for producing the chromium (III) carbonate according to claim 7, wherein after production of the chromium (III) carbonate, filtration is performed, and the chromium (III) carbonate is washed with water until the conductivity of a filtrate is 5 mS/cm or less.

9. A process for producing an aqueous solution of an inorganic acid chromium (III) salt or an aqueous solution of an organic acid chromium (III) salt, characterized by using the process according to claim 7 to produce a chromium (III) carbonate represented by $Cr_2O_3 \cdot mCO_2 \cdot nH_2O$, wherein m represents a number ranging from 0.25 to 2, and n represents a number ranging from 4 to 6, and then dissolving the chromium (III) carbonate in an aqueous solution of an inorganic acid or an aqueous solution of an organic acid.

10. A process for producing an aqueous solution comprising a source of chromium (III), characterized by using the process according to claim 7 to produce a chromium (III) carbonate, and then dissolving the chromium (III) carbonate in an aqueous solution comprising two or more acids.

* * * * *